(12) United States Patent
Xu

(10) Patent No.: US 11,591,839 B2
(45) Date of Patent: Feb. 28, 2023

(54) TELESCOPIC LINEAR MOTOR STRUCTURE FOR SLIDING DOOR

(71) Applicant: ZHONGSHAN OPIKE HARDWARE PRODUCTS CO., LTD, Guangdong (CN)

(72) Inventor: Jiangde Xu, Guangdong (CN)

(73) Assignee: ZHONGSHAN OPIKE HARDWARE PRODUCTS CO., LTD, Zhongshan (CN)

( * ) Notice: Subject to any disclaimer, the term of this patent is extended or adjusted under 35 U.S.C. 154(b) by 99 days.

(21) Appl. No.: 16/932,825

(22) Filed: Jul. 19, 2020

(65) Prior Publication Data

US 2020/0347658 A1    Nov. 5, 2020

Related U.S. Application Data

(63) Continuation of application No. PCT/CN2018/107201, filed on Sep. 25, 2018.

(30) Foreign Application Priority Data

Feb. 2, 2018  (CN) .......................... 201810105577.7
Feb. 2, 2018  (CN) .......................... 201820182464.2

(51) Int. Cl.
    *E05F 11/00*  (2006.01)
    *E05F 15/60*  (2015.01)
    (Continued)

(52) U.S. Cl.
    CPC ............ *E05F 15/60* (2015.01); *E05D 15/063* (2013.01); *H02K 41/031* (2013.01); *E05Y 2900/132* (2013.01)

(58) Field of Classification Search
    CPC ......... E05F 15/60; E05F 15/00; E05F 15/632; E05F 15/635; E05D 16/063;
(Continued)

(56) References Cited

U.S. PATENT DOCUMENTS 5,712,516 A * 1/1998 Kabout ................... E05F 15/60
    310/12.33
8,274,188 B2 * 9/2012 Evans ................. E05D 15/0647
    384/42

(Continued)

FOREIGN PATENT DOCUMENTS

CN     102733708 A     10/2012
DE     202011001533 U1 *  4/2011  .............. E05F 15/60
(Continued)

OTHER PUBLICATIONS

International Search Report of PCT Patent Application No. PCT/CN2018/107201 dated Dec. 20, 2018.

*Primary Examiner* — Jerry E Redman

(57) ABSTRACT

The invention relates to a linear motor structure for a sliding door, comprising a rotor assembly, wherein the rotor assembly includes a fixed part and a movable part, the fixed part is provided with a permanent magnet, a slot hole is formed in a bottom part of the permanent magnet, the movable part is provided with a telescopic rod that is slidably inserted into the slot hole from one end of the slot hole, and a motion transmission part capable of transmitting a motion of the rotor assembly, and the movable part and the fixed part are fixed by a fastener. The linear motor structure is novel in design, reasonable in structure and favorable in adaptability due to the capability of flexibly adjustment of the rotor assembly according to a width of a door frame.

8 Claims, 16 Drawing Sheets

(51) Int. Cl.
*E05D 15/06* (2006.01)
*H02K 41/03* (2006.01)

(58) Field of Classification Search
CPC .............. E05D 16/0626; H02K 41/031; E05Y 2209/132; E05Y 2201/264; E05Y 2201/46; E05Y 2201/668; E05Y 2800/372; E06B 3/46; E06B 3/487
USPC .......................................................... 49/360
See application file for complete search history.

(56) References Cited

U.S. PATENT DOCUMENTS

| | | | | |
|---|---|---|---|---|
| 8,607,504 | B2 * | 12/2013 | Peeters Weem | E05F 15/60 |
| | | | | 310/12.24 |
| 2001/0011439 | A1 * | 8/2001 | Maki | E05D 15/063 |
| | | | | 49/360 |
| 2008/0209813 | A1 * | 9/2008 | Haab | E05D 15/0621 |
| | | | | 49/360 |

FOREIGN PATENT DOCUMENTS

| | | | | | |
|---|---|---|---|---|---|
| EP | | 2476842 A2 * | 7/2012 | ......... | E05D 15/0652 |
| EP | | 2476849 A2 * | 7/2012 | ......... | E05D 15/0652 |
| EP | | 2933411 A1 * | 10/2015 | .............. | E05F 15/60 |
| ES | | 1110505 U  * | 5/2014 | .............. | E05F 15/60 |
| JP | | 06101379 A  * | 4/1994 | .............. | E05F 15/60 |
| KR | | 101884785 B1 * | 8/2018 | .............. | E05F 15/60 |
| WO | WO-2009021629 A2 * | | 2/2009 | ........... | H02K 11/215 |

* cited by examiner

TELESCOPIC LINEAR MOTOR STRUCTURE FOR SLIDING DOOR

CROSS REFERENCE TO RELATED APPLICATIONS

The present application is a Continuation Application of PCT Application No. PCT/CN2018/107201 filed on Sep. 25, 2018, which claims the benefit of Chinese Patent Application Nos. 201810105577.7 and 201820182464.2 filed on Feb. 2, 2018. All the above are hereby incorporated by reference in their entirety.

FIELD OF THE INVENTION

The present invention relates to a linear motor structure and in particular relates to a telescopic linear motor structure for a sliding door.

BACKGROUND OF THE INVENTION

A linear motor generally comprises a stator assembly and a rotor assembly, the stator assembly is mounted and fixed above a track, and the rotor assembly is provided with a permanent magnet, is mounted in parallel below the stator assembly and is spaced from the stator assembly for a certain gap. During work, a current in the stator assembly is changed by a controller, the rotor assembly provided with the permanent magnet is driven to slide left and right in the track due to an electromagnetic induction principle, then, the rotor assembly is connected with a door body to transfer a motion itself to the door body, and thus, the door body is opened or closed. In the prior art, the rotor assembly is generally not adjustable, the prepared rotor assembly may be only applied to a door frame with a specific width, but for other door frames with different widths, rotor assemblies corresponding to the door frames with different widths need to be reproduced. In other words, the rotor assembly in the prior art is only applied to an unchanged occasion and incapable of adapting to door frames with various widths. In this way, a manufacturer has to design a specific rotor assembly for each door frame width, and thus, defects such as wide varieties and relatively high cost are caused.

SUMMARY OF INVENTION

The present invention aims at overcoming defects in the prior art to provide a telescopic linear motor structure for a sliding door. The linear motor structure is novel in design, reasonable in structure and capable of adapting to door frames with various widths due to the capability of flexible adjustment of a length of a rotor assembly.

In order to solve the above-mentioned defects, a technical solution provided by the present invention is as follows:

a telescopic linear motor structure for a sliding door is provided, and the telescopic linear motor structure for the sliding door comprises a rotor assembly, wherein the rotor assembly comprises a fixed part and a movable part, the fixed part is provided with a permanent magnet, a slot hole is formed in a bottom part of the permanent magnet, the movable part is provided with a telescopic rod that is slidably inserted into the slot hole from one end of the slot hole, and a motion transmission part capable of transmitting a motion of the rotor assembly, and the movable part and the fixed part are fixed by using a fastener.

In the prior art, the rotor assembly is generally not adjustable, the prepared rotor assembly may be only applied to a door frame with a specific width, but for other door frames with different widths, corresponding rotor assemblies need to be reproduced. In other words, the rotor assembly in the prior art is only applied to an unchanged occasion, and incapable of adapting to door frames with various widths. In this way, a manufacturer has to design a specific rotor assembly for each door frame width, and thus, defects such as wide varieties and relatively high cost are caused. In order to solve such a problem, the present invention provides a telescopic linear motor structure for a sliding door and specifically provides a telescopic rotor assembly. The rotor assembly comprises a fixed part and a movable part, a permanent magnet is mounted on the fixed part, and a part of the permanent magnet is exposed outside; the exposed part is located under the stator assembly; and during use, when the stator assembly is powered on, the fixed part of the rotor assembly located below the stator assembly moves left or right along a track under the drive action of a magnetic field force due to an electromagnetic induction principle. A slot hole is formed in a bottom part of the permanent magnet, a telescopic rod of the movable part is inserted into the slot hole and may slide left or right in the slot hole, and the movable part is further provided with a motion transmission part which is connected with a door body and may transmit a motion of the rotor assembly to the door body. The fixed part may slide left and right under the drive action of the magnetic field force, the movable part is inserted into the slot hole by virtue of the telescopic rod, and therefore, in order to transmit the sliding of the fixed part to the movable part, it is necessary that the movable part and the fixed part are connected and fixed by using a fastener.

In this way, for occasions where widths of door frames are different, the rotor assembly may be elongated or shortened by only adjusting a length of the telescopic rod inserted into the slot hole. Namely, the telescopic rod is pulled a little more out of the slot hole when a door frame is wider, and the telescopic rod is pulled a little less out of the slot hole when the door frame is narrower. In other words, the length of the telescopic rod pulled out of the slot hole may be flexibly adjusted according to different demands, so that the rotor assembly may be applied to various occasions where the widths of the door frames are different, and the rotor assembly is favorable in universality. Once the length of the telescopic rod is adjusted according to a specific occasion, the movable part and the fixed part are connected and fixed by a fastener, so that the movable part and the fixed part may slide synchronously, the sliding may be further transmitted to the door body by the motion transmission part on the movable part to drive the door body to be opened or closed.

Further, in an embodiment, the fixed part is divided into an upper part and a lower part, the upper part of the fixed part is longer than the lower part of the fixed part, and the slot hole for inserting the telescopic rod is formed between the upper part and the lower part. The purpose of such an arrangement is to make the motion transmission part of the movable part slide to be below the upper part of the fixed part and be in contact with an end part of the lower part of the fixed part. In this way, the overall rotor assembly may be further shortened to adapt to a narrower door frame, so that the adaptability of the rotor assembly is enhanced to the maximum extent.

Further, one end of the telescopic rod is inserted into the slot hole, the other end of the telescopic rod is connected with a guide wheel, the upper part of the guide wheel is capable of sliding in the slot hole and sliding to the end part of the lower part of the fixed part, two sides of the guide wheel are provided with wheels, and the motion transmission part is arranged in the middle of the guide wheel.

Further, one end of the telescopic rod is inserted into the slot hole, and the length of the telescopic rod pulled out of the slot hole is adjusted according to an actual demand, so that a telescopic function of the rotor assembly is achieved. The other end of the telescopic rod is connected with the guide wheel, the upper part of the guide wheel is capable of sliding in the slot hole, and when the door frame is narrower, the guide wheel follows the telescopic rod to slide in the slot hole, may slide to the end part of the lower part of the fixed part and may be located below the upper part of the fixed part, and thus, the rotor assembly may adapt to a narrower door frame. In addition, the motion transmission part is arranged in the middle of the guide wheel, during use, the motion transmission part is connected with the door body, and the guide wheel drives the door body connected with the motion transmission part to slide synchronously when following the telescopic rod to slide in the track. Two sides of the guide wheel are further provided with wheels, on the one hand, the wheels may slide on the track to play a role in guiding the door body, and on the other hand, the wheels also bear the weight of the door body.

Further, the other end of the fixed part is provided with an independent guide wheel without a telescopic rod. As mentioned above, the guide wheel connected with the telescopic rod is connected with one end of the door body by the motion transmission part, and in order to keep balance, the other end of the door body needs to be connected in the same way. Specifically, the other end of the fixed part is provided with the independent guide wheel comprising a mounting block, two sides of the mounting block are provided with wheels, and two sides of an upper part of the mounting block are symmetrically provided with inserting parts which can be inserted in different positions of the rotor assembly along a length direction of the rotor assembly. In this way, the upper part of the independent guide wheel may slide into the slot hole when the door frame is narrower, and the upper part of the independent guide wheel may be separated from the slot hole and connected with the door body at a position farther from one end of the fixed part when the door frame is wider. In other words, limitations on the length of the fixed part may be broken by arranging the independent guide wheel without the telescopic rod at the other end of the fixed part, and thus, an adaptable width range of the door frame is further enlarged.

Further, an independent wheel set is further arranged between the independent guide wheel and the lower part of the fixed part, and the upper part of the independent wheel set is slidably arranged in the slot hole, front and rear sides of the independent wheel set are provided with wheels, and the independent wheel set is provided with a fixing hole for mutual fixation with the fixed part. Since the upper part of the fixed part is longer than the lower part of the fixed part, when the upper part of the independent wheel set being located in the slot hole, the independent guide wheel plays a certain role in supporting the upper part of the fixed part to prevent the upper part of the fixed part from deforming. When the upper part of the independent guide wheel is separated from the slot hole, a part, longer than the lower part of the fixed part, of the upper part of the fixed part is in an unsupported state, resulting in a risk of deformation as time goes on. In order to solve the risk, the independent wheel set is arranged on the part to support the upper part of the fixed part to prevent the upper part of the fixed part from deforming. The upper part of independent wheel set may slide in the slot hole; when the door frame is narrower, the upper part of independent guide wheel slides into the slot hole, and the independent wheel set may slide to the end part of the lower part of the fixed part to make room for the independent guide wheel; and when the door frame is wider, the upper part of independent guide wheel is separated from the slot hole, and the independent wheel set may slide towards an outer end of the slot hole to support the upper part of the fixed part. The independent wheel set is further provided with a fixing hole, once the position of the independent wheel set is adjusted, the independent wheel set may be connected and fixed with the fixed part by virtue of the fixing hole so as to be prevented from optionally sliding in the slot hole. In addition, the two sides of the independent wheel set are further provided with the wheels by which the fixed part may better slide on the track.

Further, in another embodiment, two movable parts are provided and are respectively inserted into the slot hole from left and right ends. In the embodiment, the two movable parts are provided with telescopic rods and motion transmission parts, and are in a bilateral symmetry state. During use, the left and right movable parts are simultaneously pulled out of the slot hole for certain lengths according to an actual width of a door frame, the pulled-out length is longer when the door frame is wider, and the pulled-out length is shorter when the door frame is narrower, and the movable parts may be applied to door frames with various widths in such an adjustment way.

Further, the telescopic rod is internally provided with a slot in which the motion transmission part may slidably insert.

Further, in the embodiment, the motion transmission part is of T-shaped structure and comprises a vertical rod and a horizontal bar, the vertical rod is connected with the door body to transmit the motion of the rotor assembly to the door body so as to drive the door body to slide together, and the horizontal bar is inserted into the slot of the telescopic rod so as to be fixed with the telescopic rod into a whole.

Further, a specific way for fixing the horizontal bar and the telescopic rod is that the horizontal bar is provided with a screw hole, and the screw is mounted in the screw hole, and is screwed down when fixation is required.

BRIEF DESCRIPTION OF THE DRAWINGS

In order to describe the technical solutions in the embodiments of the present invention or the prior art more clearly, accompanying drawings required for describing the embodiments or the prior art will be briefly introduced below. Apparently, the accompanying drawings in the following description show only some embodiments of the present invention, and those of ordinary skill in the art can still acquire other accompanying drawings from structures shown in these accompanying drawings without creative efforts.

Figure 1:
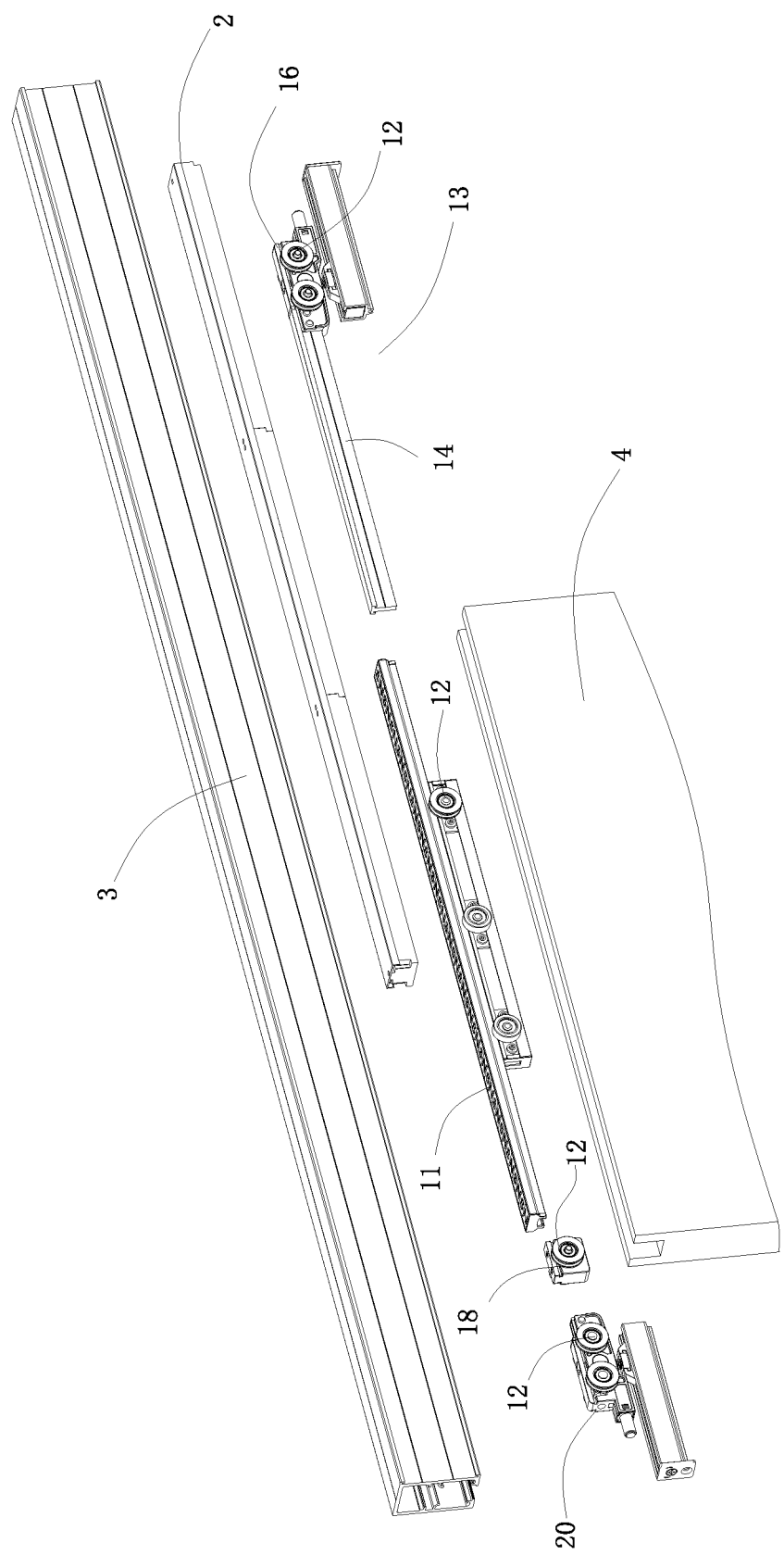
FIG. 1 shows an explosive view of embodiment 1.
Figure 2:
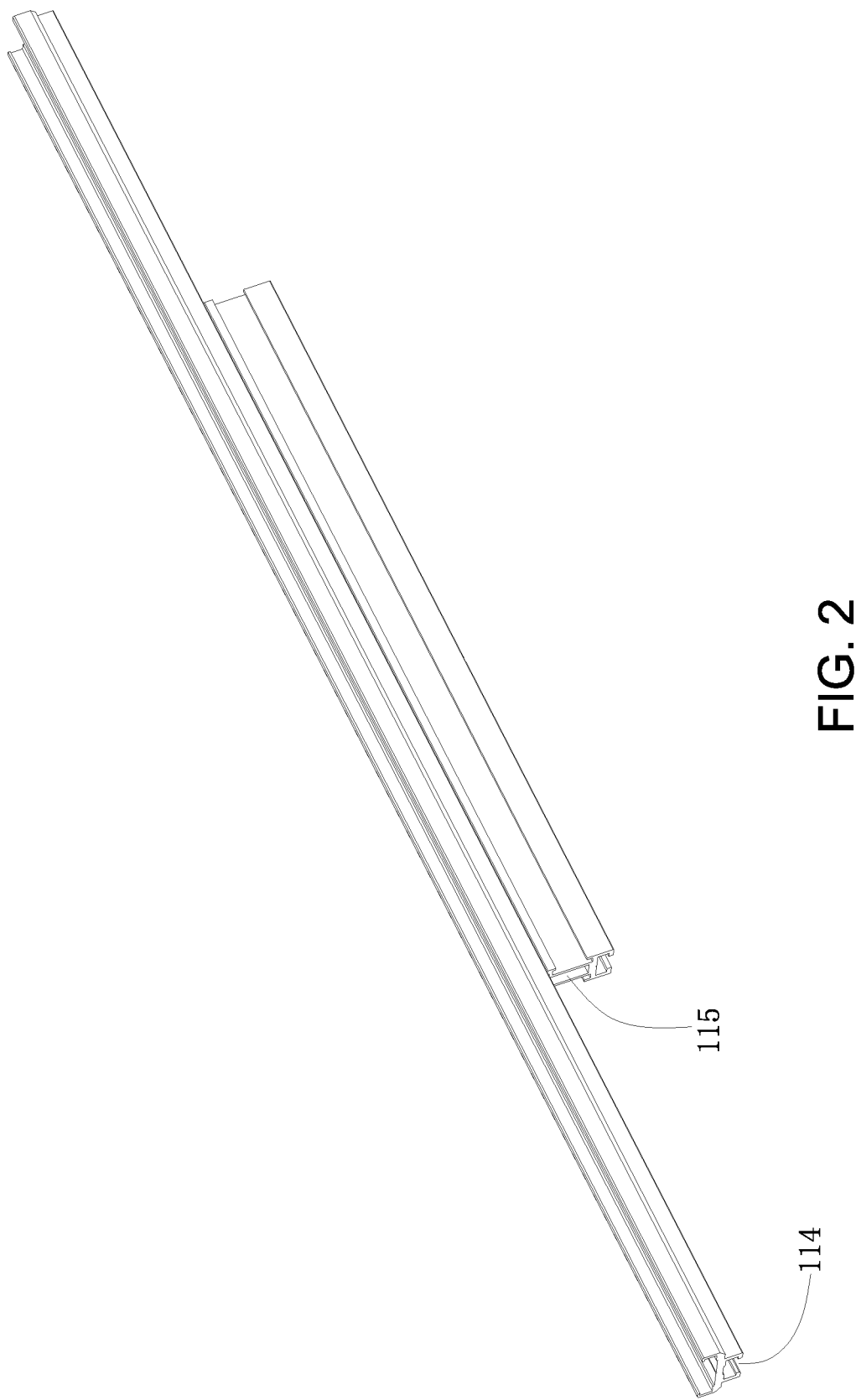
FIG. 2 shows a stereogram of the fixed part in embodiment 1.
Figure 3:
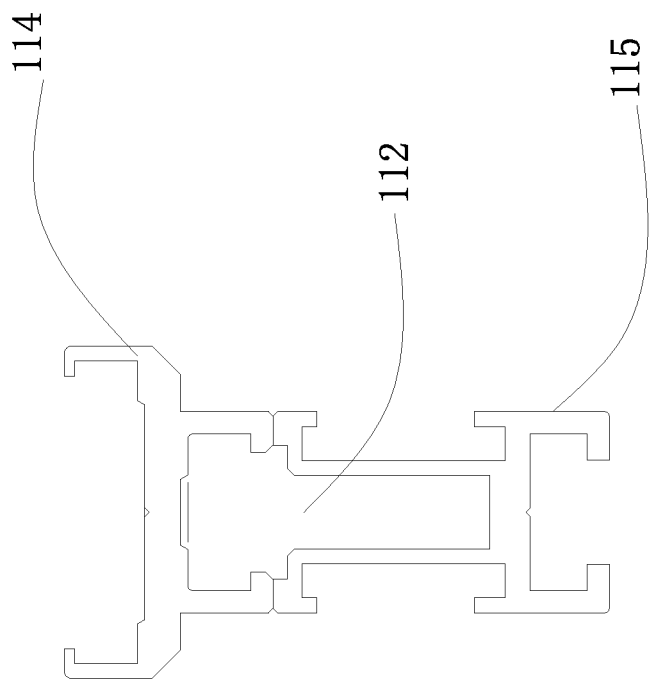
FIG. 3 shows a left view of FIG. 2.
Figure 4:
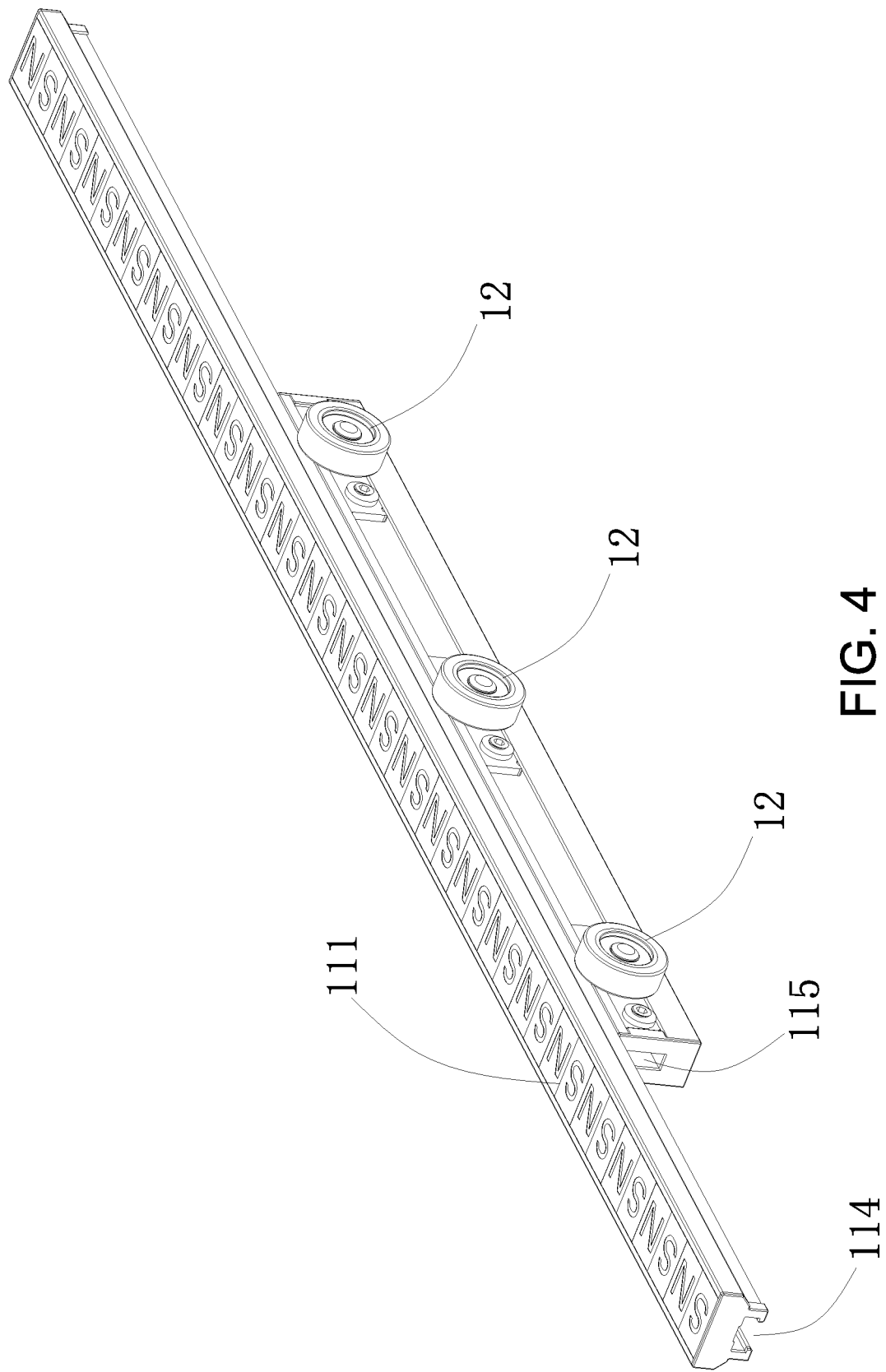
FIG. 4 shows a stereogram that the permanent magnet and wheels are mounted in embodiment 1.
Figure 5:
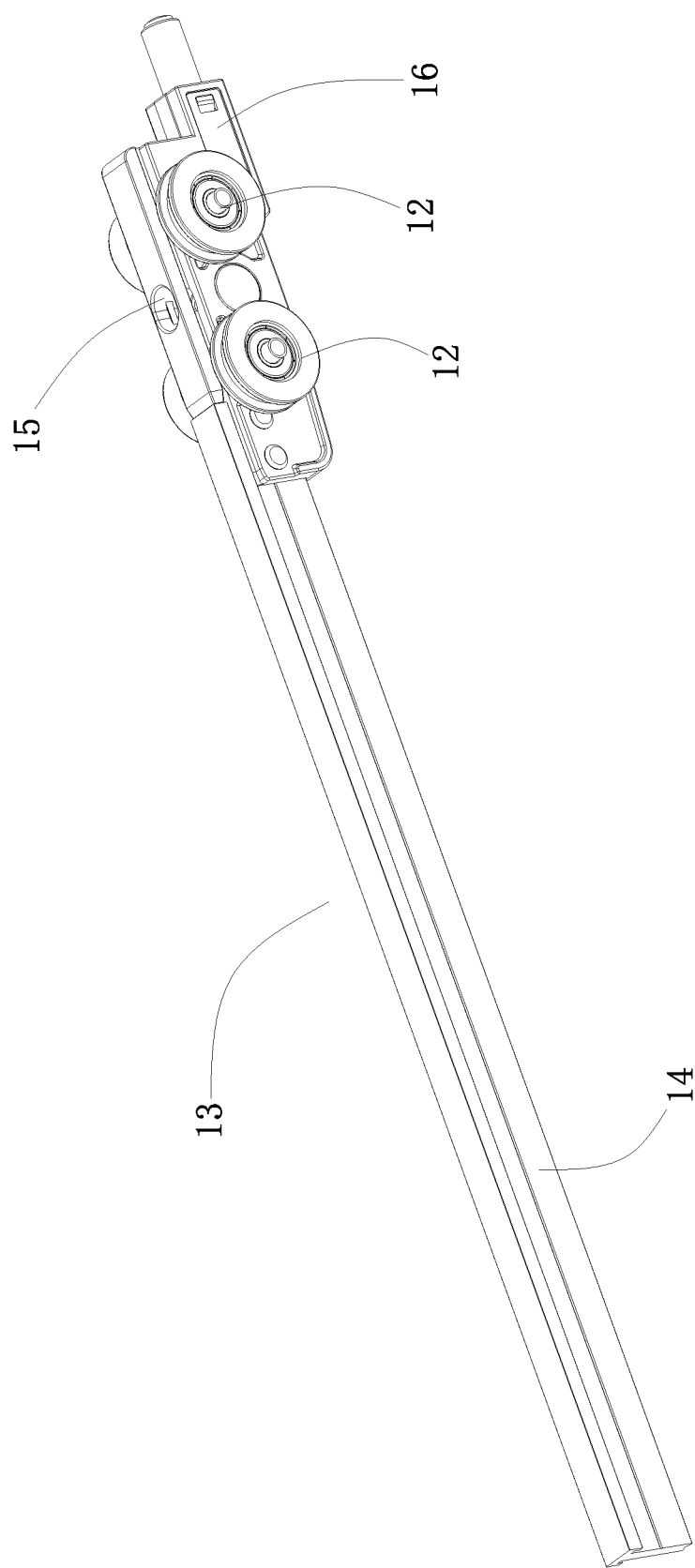
FIG. 5 shows a stereogram of the movable part in embodiment 1.
Figure 6:
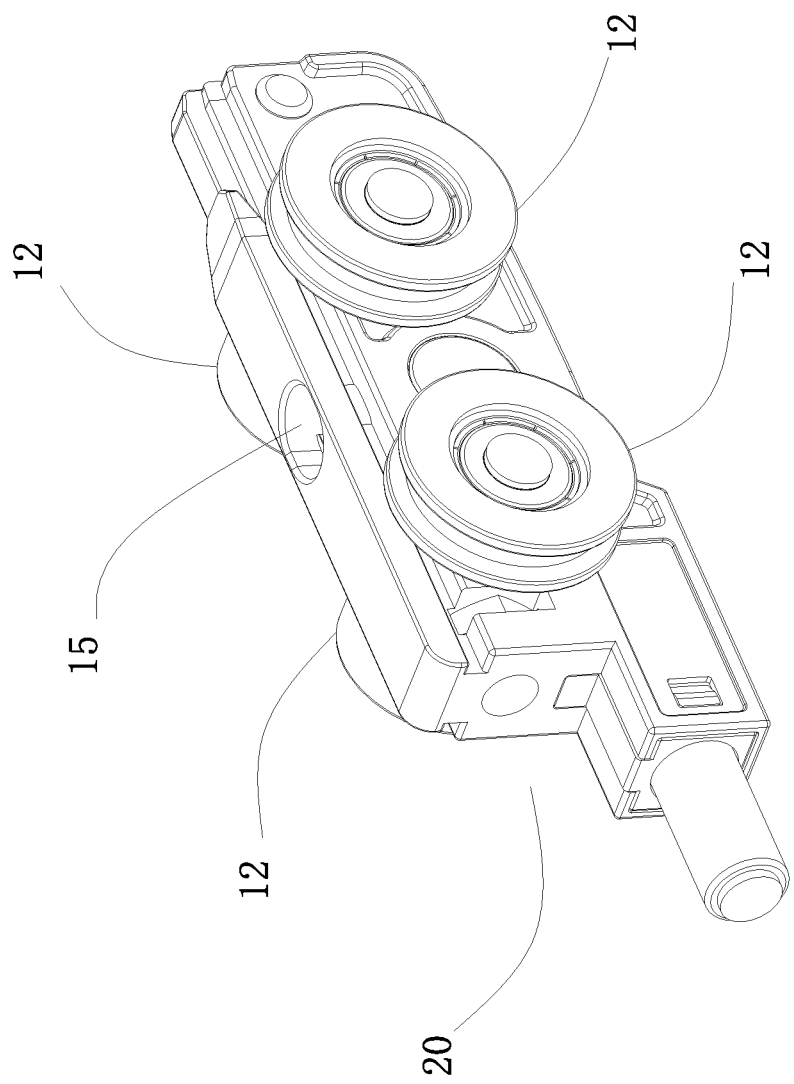
FIG. 6 shows a stereogram of the independent guide wheel in embodiment 1.
Figure 7:
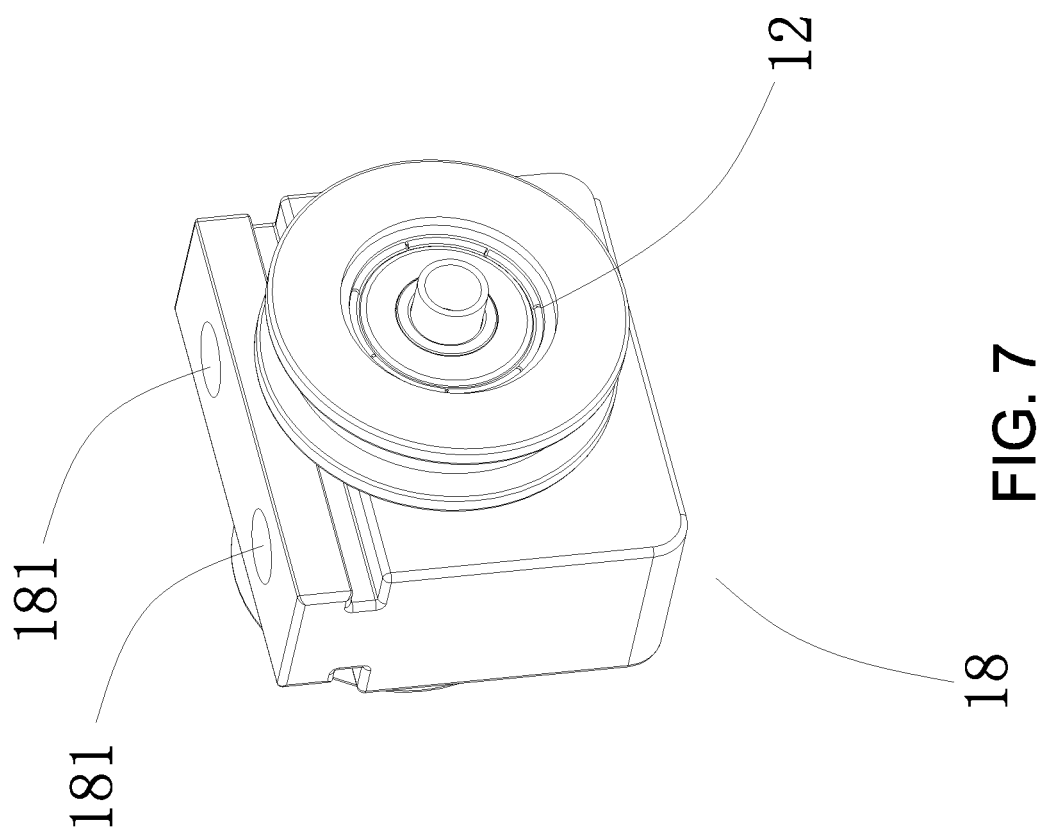
FIG. 7 shows a stereogram of an independent wheel set in embodiment 1.
Figure 8:
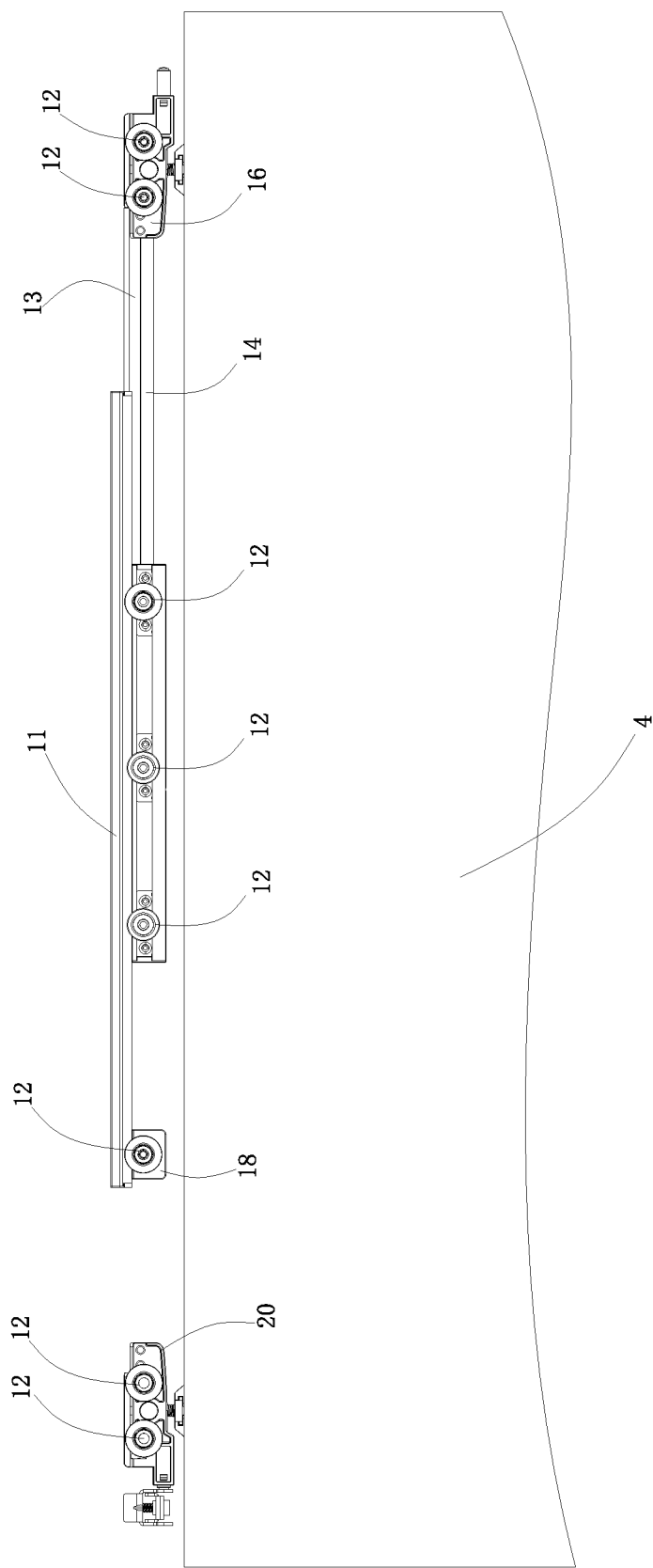
FIG. 8 shows a schematic diagram that the rotor assembly in embodiment 1 is mounted on a wider door body.
Figure 9:
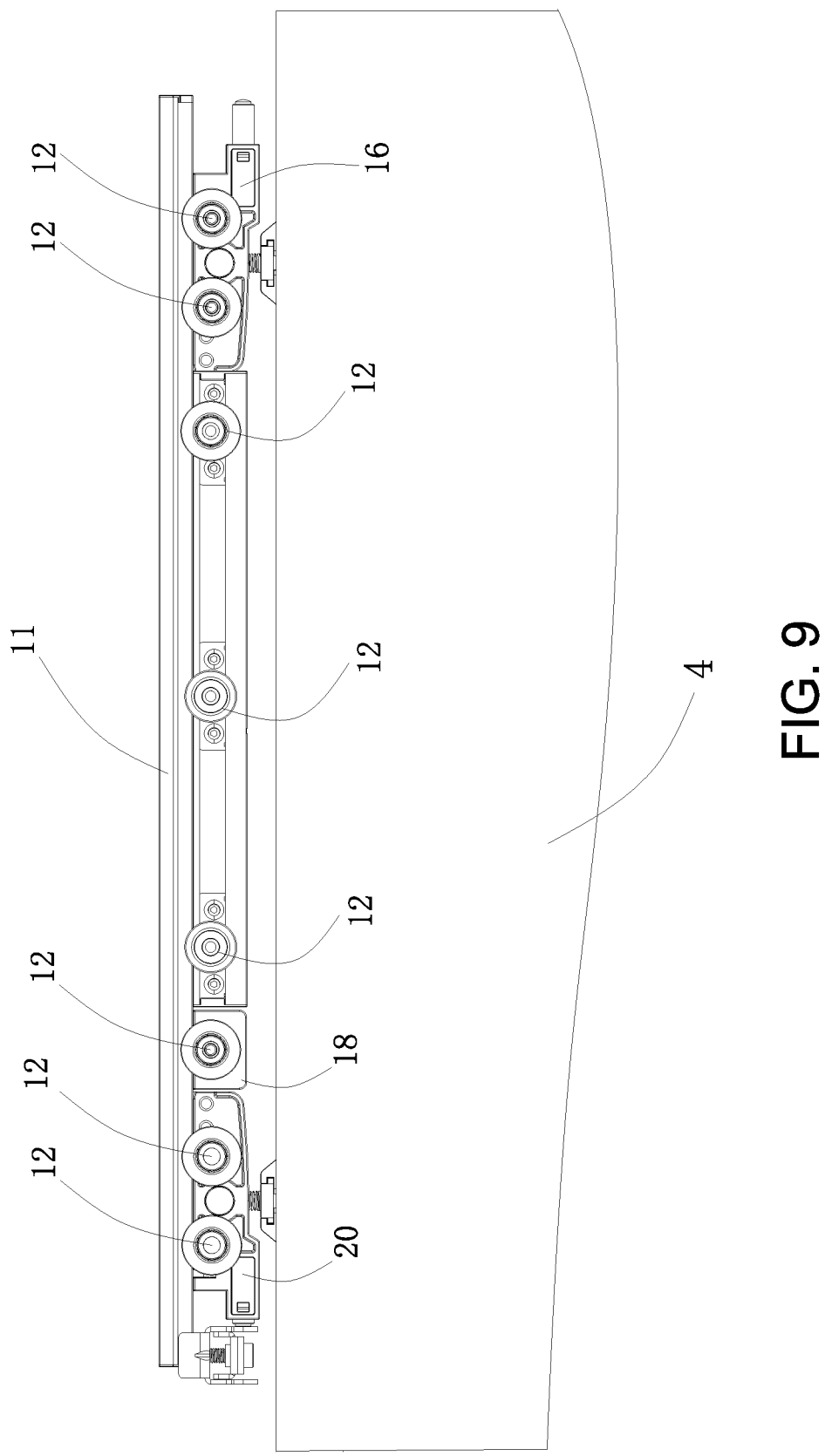
FIG. 9 shows a schematic diagram that the rotor assembly in embodiment 1 is mounted on a narrower door body.

Symbols of the accompanying drawings are as follows:

rotor assembly 1, fixed part 11, slot hole 112, upper part of the fixed part 114, lower part of the fixed part 115, wheel 12, movable part 13, telescopic rod 14, motion transmission part 15, vertical rod 151, horizontal bar 152, screw hole 153, screw 154, guide wheel 16, fastener 19, independent guide wheel 20, independent wheel set 18, fixing hole 181, stator assembly 2, track 3, door body 4.

DETAILED DESCRIPTION OF ILLUSTRATED EMBODIMENTS

Technical solutions in the embodiments of the present invention will be described clearly and completely below in conjunction with the accompanying drawings in the embodiments of the present invention. Obviously, the described embodiments are only a part of the embodiments of the present invention, not all the embodiments. Based on the embodiments of the present invention, all other embodiments obtained by those of ordinary skill in the art without creative work shall fall within the protection scope of the present invention.

It should be noted that all directional indications (such as upper, lower, left, right, front, rear, outer, inner . . . ) in the embodiments of the present invention are only intended to explain a relative position relation, movement conditions and the like among all components in a specific posture (as shown in the accompanying drawings), and if the specific posture is changed, the directional indications are also changed accordingly.

Figure 10:
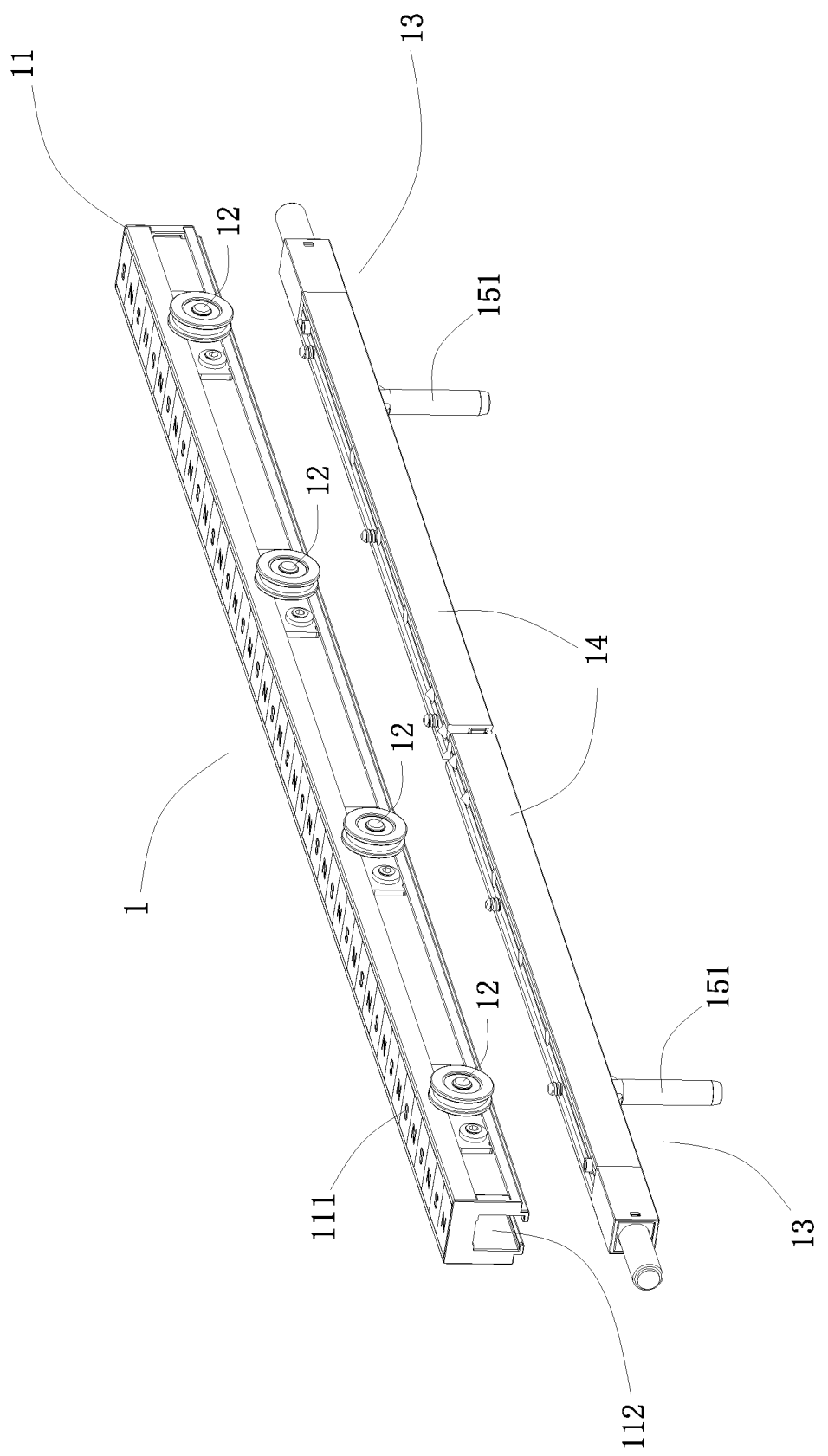
FIG. 10 shows an explosive view of embodiment 2.
Figure 11:
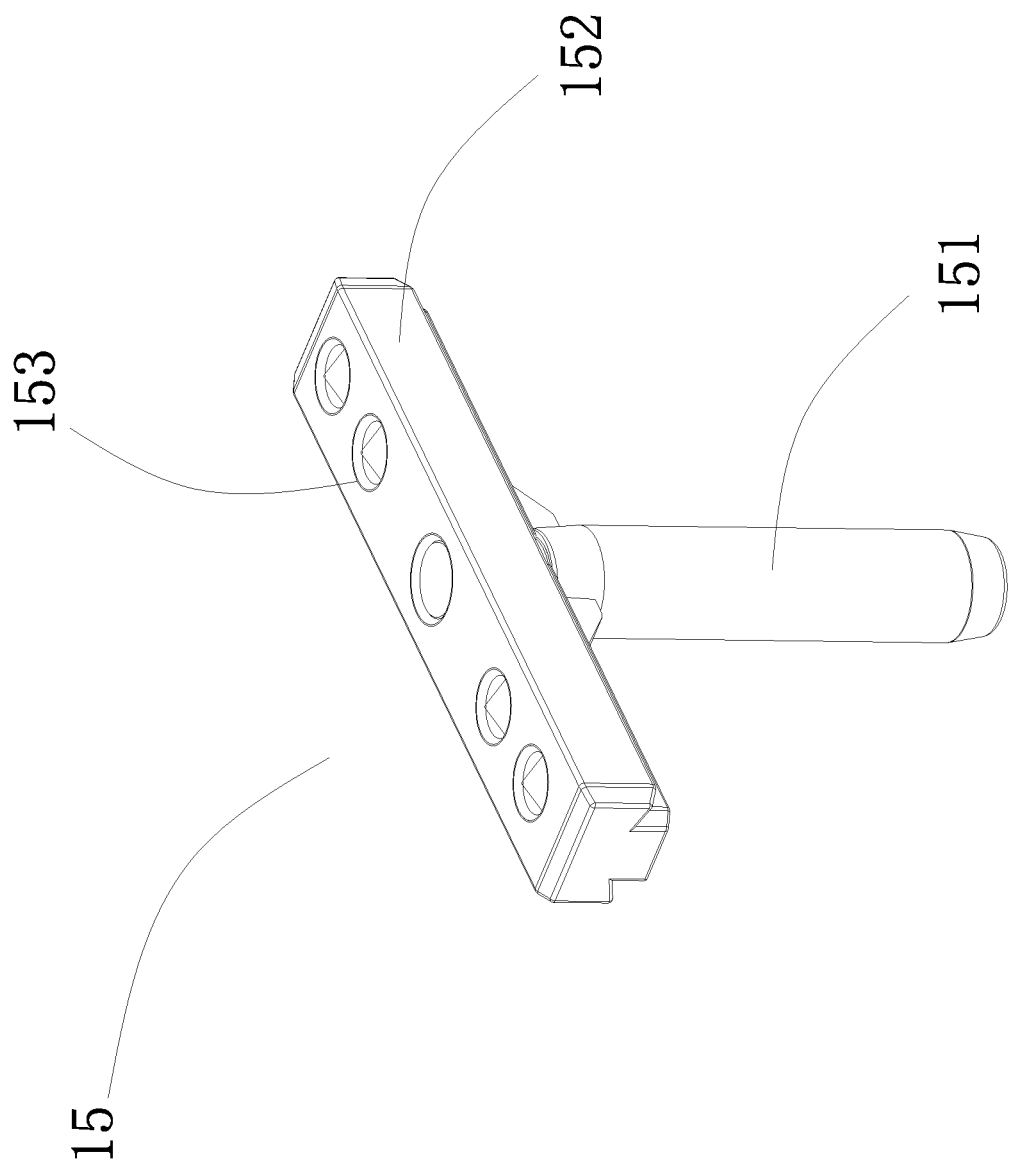
FIG. 11 shows a stereogram of the motion transmission part in the embodiment 2.
Figure 12:
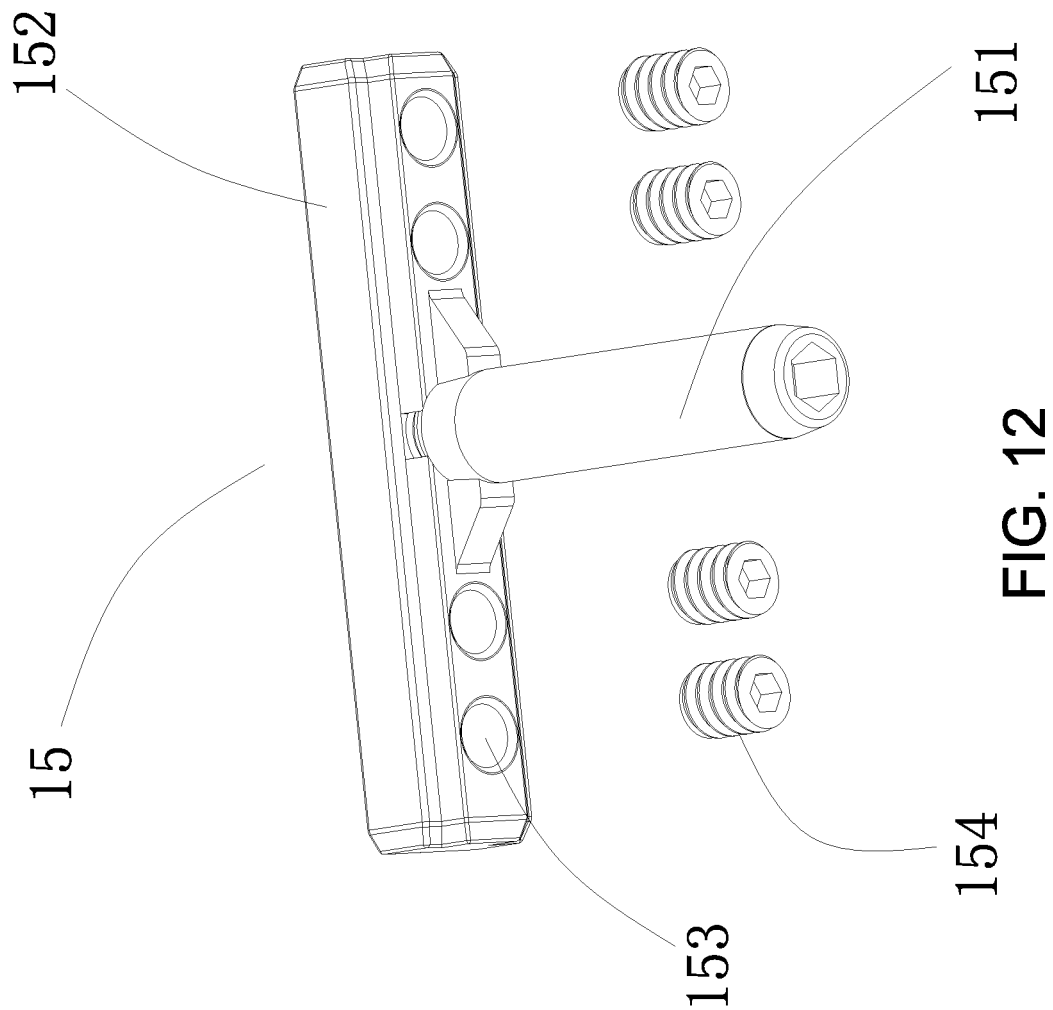
FIG. 12 shows an assembly schematic diagram of the motion transmission part in embodiment 2.
Figure 13:
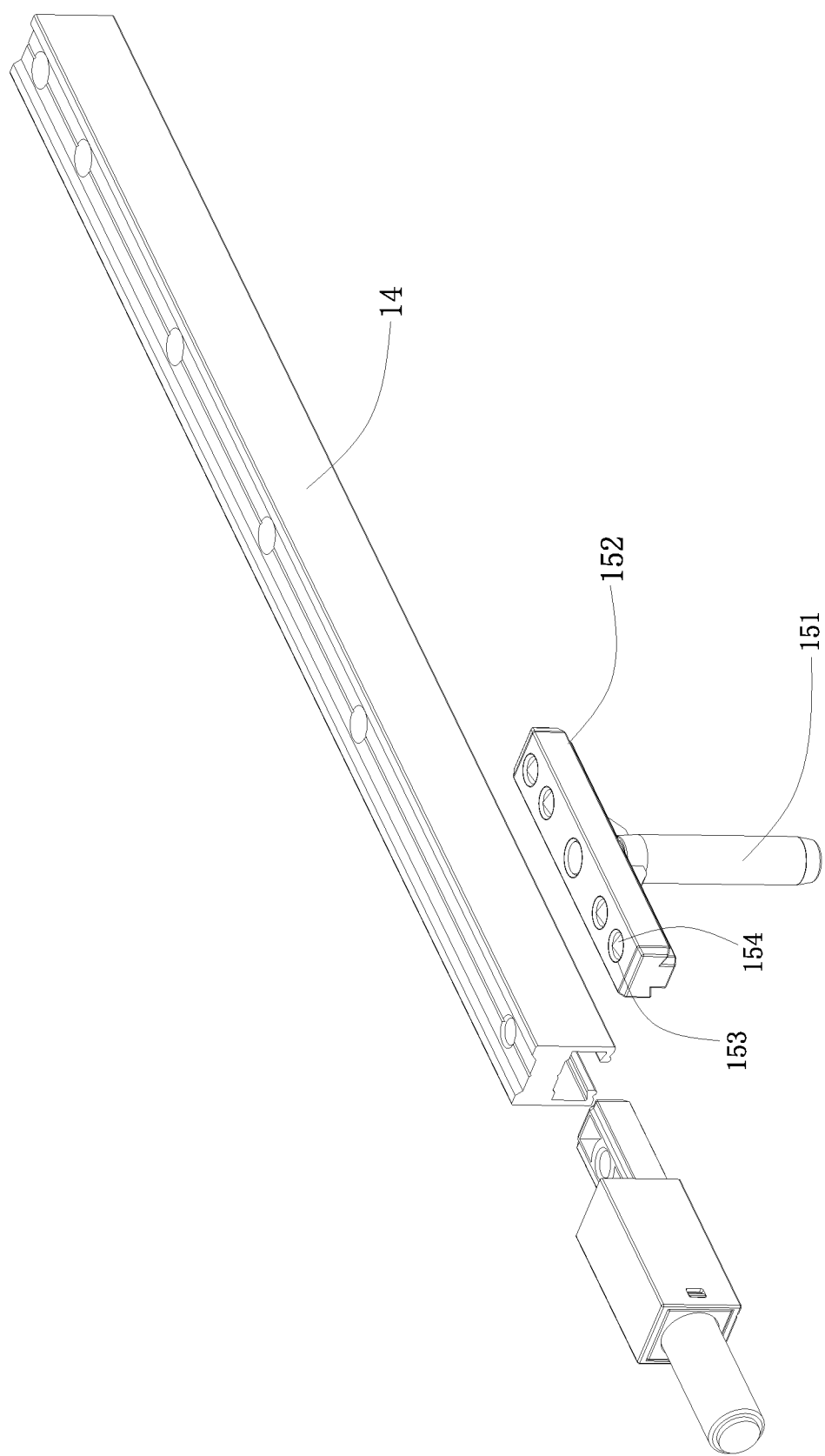
FIG. 13 shows an assembly schematic diagram of the motion transmission part and the telescopic rod in the embodiment 2.
Figure 14:
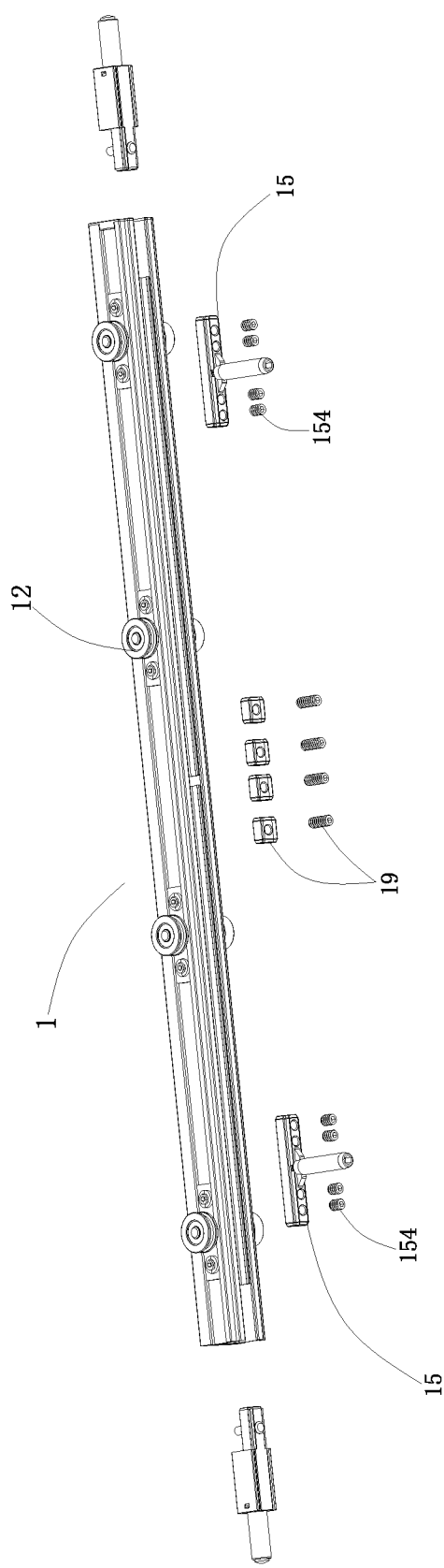
FIG. 14 shows an assembly schematic diagram of the rotor assembly in embodiment 2.
Figure 15:
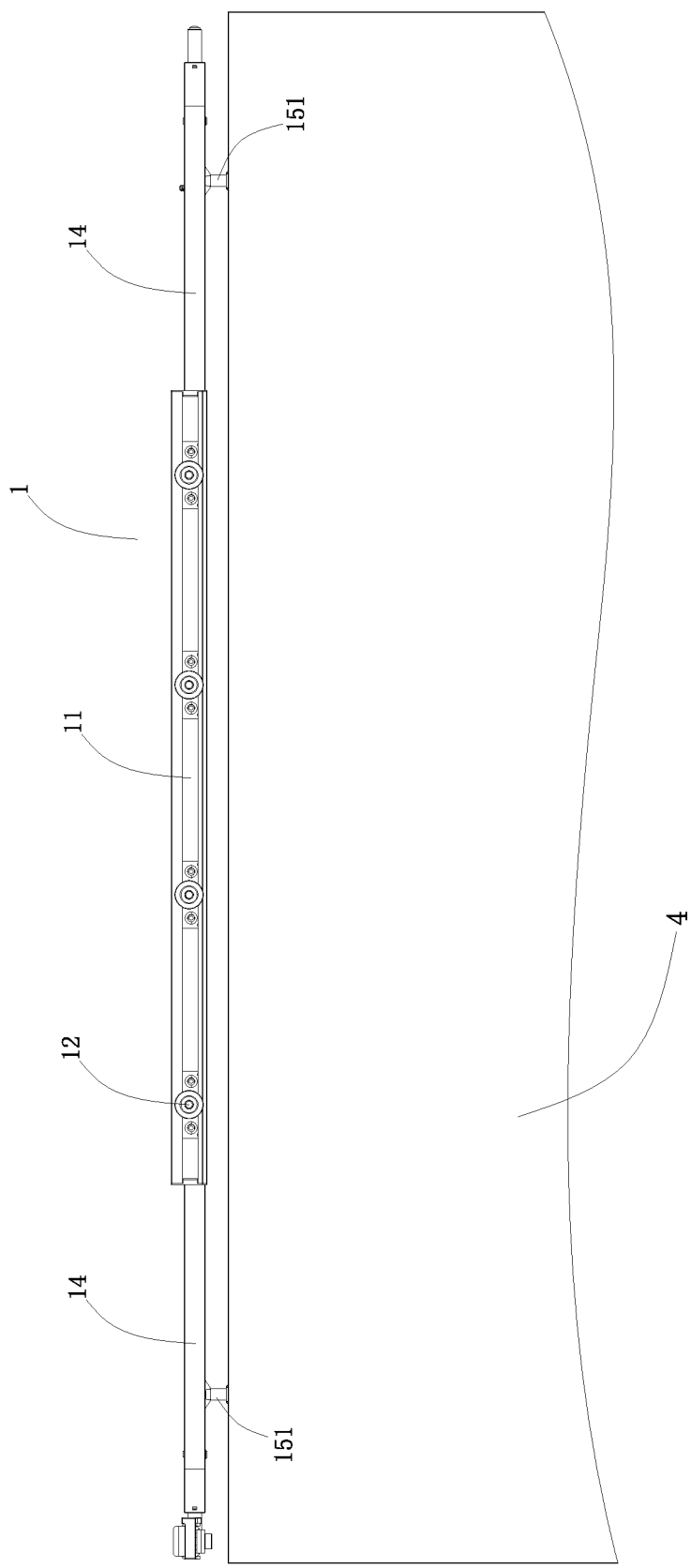
FIG. 15 shows a schematic diagram that the rotor assembly in embodiment 2 is mounted on a wider door body.
Figure 16:
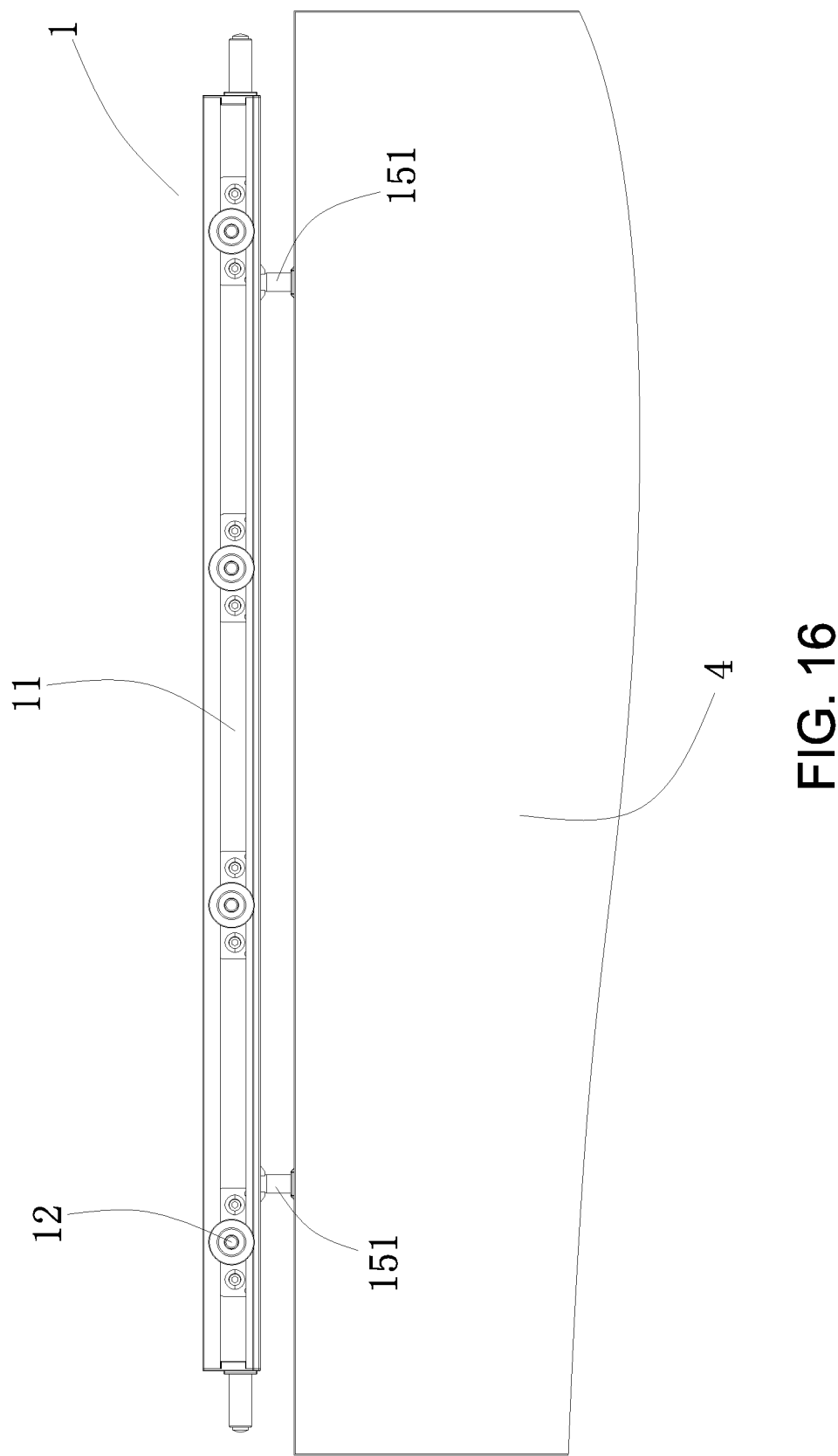
FIG. 16 shows a schematic diagram that the rotor assembly in embodiment 2 is mounted on a narrower door body.

A telescopic linear motor structure for a sliding door, as shown in FIG. 1 and FIG. 10, comprises a rotor assembly 1, the rotor assembly 1 comprises a fixed part 11 and a movable part 13, the fixed part 11 is provided with a permanent magnet 111, a slot hole 112 is formed in a bottom part of the permanent magnet 111, the movable part 13 is provided with a telescopic rod 14 that can be slidably inserted into the slot hole 112 from one end of the slot hole 112, and a motion transmission part 15 capable of transmitting the motion of the rotor assembly 1, and the movable part 13 and the fixed part 11 are fixed by using a fastener 19.

In the prior art, the rotor assembly 1 is generally not adjustable, the prepared rotor assembly 1 may be only applied to a door frame with a specific width, but for other door frames with different widths, corresponding rotor assemblies 1 have to be reproduced. In other words, the rotor assembly 1 in the prior art is only applied to an unchanged occasion and incapable of adapting to door frames with various widths. In this way, a manufacturer has to design a specific rotor assembly 1 for each door frame width, and thus, defects such as wide varieties and relatively high cost are caused. In order to solve the defects, the present invention designs a telescopic linear motor structure for a sliding door and specifically designs a telescopic rotor assembly 1; the rotor assembly 1 comprises a fixed part 11 and a movable part 13, a permanent magnet 111 is mounted on the fixed part 11, a part of the permanent magnet 111 is exposed outside, and the exposed part is located under a stator assembly 2; and during use, when the stator assembly 2 is powered on, the fixed part 11 of the rotor assembly 1 located below the stator assembly 2 moves left and right along a track 3 under the drive action of a magnetic field force due to an electromagnetic induction principle. A slot hole 112 is further formed in a bottom part of the permanent magnet 111, a telescopic rod 14 of the movable part 13 is inserted into the slot hole 112 and may slide left and right in the slot hole 112, and the movable part 13 is further provided with a motion transmission part 15 which is connected with a door body 4 and may transmit a motion of the rotor assembly 1 to the door body 4. The fixed part 11 may slide left and right under the drive action of the magnetic field force, the movable part 13 is inserted into the slot hole 112 by virtue of the telescopic rod 14, and therefore, in order to transmit the sliding of the fixed part 11 to the movable part 13, it is necessary that the movable part 13 and the fixed part 11 are connected and fixed by using a fastener 19.

In this way, for occasions where widths of door frames are different, the rotor assembly 1 may be elongated or shortened by only adjusting the length of the telescopic rod 14 inserted into the slot hole 112, namely the telescopic rod 14 is pulled a little more out of the slot hole 112 when a door frame is wider, and the telescopic rod 14 is pulled a little less out of the slot hole 112 when the door frame is narrower. In other words, the length of the telescopic rod 14 pulled out of the slot hole 112 may be flexibly adjusted according to different demands, so that the rotor assembly 1 may be applied to various occasions where the widths of the door frames are different, and has good universality. Once the length of the telescopic rod 14 is adjusted according to a specific occasion, the movable part 13 and the fixed part 11 may be connected and fixed by the fastener 19, so that the movable part 13 and the fixed part 11 may slide synchronously, the sliding may be further transmitted to the door body 4 by the motion transmission part 15 on the movable part 13 to drive the door body to be opened or closed.

Further, in one embodiment, as shown in FIG. 2 to FIG. 9, the fixed part 11 is divided into an upper part 114 and a lower part 115, the upper part 114 of the fixed part is longer than the lower part of the fixed part 115, and the slot hole 112 for inserting the telescopic rod 14 is formed between the upper part 114 and the lower part 115. The purpose of such an arrangement is to make the motion transmission part 15 of the movable part 13 slide to be below the upper part 114 of the fixed part and be in contact with an end part of the lower part 115 of the fixed part, in this way, the overall rotor assembly 1 may be further shortened to adapt to a narrower door frame, so that the adaptability of the rotor assembly 1 is enhanced to the maximum extent.

Further, one end of the telescopic rod 14 is inserted into the slot hole 112, the other end of the telescopic rod 14 is connected with a guide wheel 16 capable of sliding in the slot hole 112, two sides of the guide wheel 16 are provided with wheels 12, and the motion transmission part 15 is arranged in the middle of the guide wheel 16.

Further, one end of the telescopic rod 14 is inserted into the slot hole 112, and the length of the telescopic rod 14 pulled out of the slot hole 112 is adjusted according to an actual demand, so that a telescopic function of the rotor assembly 1 is achieved. The other end of the telescopic rod 14 is connected with the guide wheel 16, the upper part of the guide wheel 16 is capable of sliding in the slot hole 112, and when the door frame is narrower, the upper part of the guide wheel 16 follows the telescopic rod 14 to slide in the slot hole 112, may slide to the end part of the lower part 115 of the fixed part and may be located below the upper part 114 of the fixed part, and thus, the rotor assembly 1 may adapt to a narrower door frame. In addition, the motion transmission part 15 is arranged in the middle of the guide wheel 16, during use, the motion transmission part 15 is connected with the door body 4, and the guide wheel 16 drives the door body 4 connected with the guide wheel 16 to slide synchronously when following the telescopic rod 14 to slide in the track 3. Two sides of the guide wheel 16 are further provided with wheels 12, on the one hand, the wheels 12 may slide on the track 3 to play a role in guiding the door body 4, and on the other hand, the wheels 12 also bear the weight of the door body 4.

Further, the other end of the fixed part 11 is provided with an independent guide wheel 20 without a telescopic rod 14. As mentioned above, the guide wheel 16 connected with the telescopic rod 14 is connected with one end of the door body 4 by the motion transmission part 15, and in order to keep balance, the other end of the door body 4 needs to be connected in the same way. Specifically, the other end of the fixed part 11 is provided with the independent guide wheel 20 which comprises a mounting block, two sides of the mounting block are provided with wheels 12, and two sides of an upper part of the mounting block are symmetrically provided with inserting parts which can be inserted in different positions of the rotor assembly 1 along a length direction of the rotor assembly 1. In this way, the upper part of the independent guide wheel 20 may slide into the slot hole 112 when the door frame is narrower, the upper part of the independent guide wheel 20 may be separated from the slot hole 112 and connected with the door body 4 at a position farther from one end of the fixed part 11 when the door frame is wider. In other words, limitations on the length of the fixed part 11 may be broken by arranging the independent guide wheel 20 without the telescopic rod 14 on the other end of the fixed part 11, and thus, an adaptable width range of the door frame is further enlarged.

Further, an independent wheel set 18 is further arranged between the independent guide wheel 20 and the lower part 115 of the fixed part, and the upper part of independent wheel set 18 is slidably arranged in the slot hole 112, front and rear sides of the independent wheel set 18 are provided with wheels 12, and the independent wheel set 18 is provided with a fixing hole 181 for mutual fixation with the fixed part 11. Since the upper part 114 of the fixed part is longer than the lower part 115 of the fixed part, when the upper part of independent wheel set 18 being located in the slot hole 112, the independent guide wheel 20 plays a certain role in supporting the upper part 114 of the fixed part to prevent the upper part 114 of the fixed part from deforming. When the upper part of the independent guide wheel 20 is separated from the slot hole 112, a part, longer than the lower part 115 of the fixed part, of the upper part 114 of the fixed part is in an unsupported state, resulting in a risk of deformation as time goes on. In order to solve the risk, the independent wheel set 18 is arranged on the part to support the upper part 114 of the fixed part to prevent the upper part 114 of the fixed part from deforming. The upper part of the independent wheel set 18 may slide in the slot hole 112; when the door frame is narrower, the upper part of the independent guide wheel 20 slides into the slot hole 112, and the independent wheel set 18 may slide to the end part of the lower part 115 of the fixed part to make room for the independent guide wheel 20; and when the door frame is wider, the upper part of the independent guide wheel 20 is separated from the slot hole 112, and the independent wheel set 18 may slide towards an outer end of the slot hole 112 to support the upper part 114 of the fixed part. The independent wheel set 18 is further provided with the fixing hole 181, once the position of the independent wheel set 18 is adjusted, the independent wheel set 18 may be connected and fixed with the fixed part 11 by virtue of the fixing hole 181 so as to be prevented from optionally sliding in the slot hole 112. In addition, two sides of the independent wheel set 18 are further provided with the wheels 12 by which the fixed part 11 may better slide on the track 3.

Further, in another embodiment, as shown in FIG. 11 to FIG. 16, two movable parts 13 are provided and are respectively inserted into the slot hole 112 from left and right ends. In the embodiment, the two movable parts 13 are respectively provided with a telescopic rod 14 and a motion transmission part 15, and are in a bilateral symmetry state. During use, the left and right movable parts 13 are simultaneously pulled out of the slot hole 112 for certain lengths according to an actual width of a door frame, the pulled-out length is longer when the door frame is wider, and the pulled-out length is shorter when the door frame is narrower, and the movable parts 13 may be applied to door frames with various widths in such an adjustment way.

Further, the telescopic rods 14 is internally provided with slot in which the motion transmission part 15 may slidably insert.

Further, in the embodiment, the motion transmission part 15 is of T-shaped structure and comprise a vertical rod 151 and a horizontal bar 152, the vertical rod 151 is connected with the door body 4 to transmit the motion of the rotor assembly 1 to the door body 4 so as to drive the door body 4 to slide together, and the horizontal bar 152 is inserted into the slot of the telescopic rod 14 so as to be fixed with the telescopic rod 14 into a whole.

Further, a specific way for fixing the horizontal bar 152 and the telescopic rod 14 is that the horizontal bar 152 is provided with a screw hole 153, and the screw 154 is mounted in the screw hole 153, and is screwed down when fixation is required.

Although the present invention has been described hereinbefore with reference to some embodiments, however, various improvements on the present invention can be made and components in the present invention can be replaced with equivalents without departing from the scope of the present invention. Particularly, all features in all the embodiments disclosed by the present invention can be combined with each other in any way, and the absence of exhaustive description for these combinations in this specification is just for the sake of brevity and resource saving. Therefore, the present invention is not limited to the specific embodiments disclosed herein, but comprises all the technical solutions falling within the scope of claims.

The invention claimed is:

1. A telescopic linear motor structure for a sliding door, characterized by comprising:
   a rotor assembly (1), wherein the rotor assembly (1) comprises a fixed part (11) and a movable part (13), the fixed part (11) is provided with a permanent magnet (111) and a slot hole (112) located in a bottom part of the permanent magnet (111), the movable part (13) is provided with a telescopic rod (14) that is slidably inserted into the slot hole (112) from one end of the slot hole (112), and both a motion transmission part (15) capable of transmitting a motion of the rotor assembly (1), and the movable part (13) and the fixed part (11) are fixed by a fastener (19);

the fixed part (11) is divided into an upper part (114) and a lower part (115), the upper part (114) of the fixed part (11) is longer than the lower part (115) of the fixed part (11), and the slot hole (112) which allows insertion of the telescopic rod (14) is formed between the upper part (114) and the lower part (115).

2. The telescopic linear motor structure for the sliding door according to claim 1, characterized in that:

an end of the telescopic rod (14) is inserted into the slot hole (112), an opposite end of the telescopic rod (14) is connected with a guide wheel (16), an upper part of the guide wheel (16) is capable of sliding in the slot hole (112), and sliding to an end part of the lower part (115) of the fixed part (11), two sides of the guide wheel (16) are provided with wheels (12), and the motion transmission part (15) is arranged in a middle of the guide wheel (16).

3. The telescopic linear motor structure for the sliding door according to claim 2, characterized in that:

the other end of the fixed part (11) is provided with an independent guide wheel (20) without a telescopic rod (14).

4. The telescopic linear motor structure for the sliding door according to claim 3, characterized in that:

the independent guide wheel (20) comprises a mounting block, two sides of the mounting block are provided with wheels (12), and two sides of an upper part of the mounting block are provided with inserting parts which can be inserted in different positions of the rotor assembly (1) along a length direction of the rotor assembly (1).

5. The telescopic linear motor structure for the sliding door according to claim 3, characterized in that:

an independent wheel set (18) is further arranged between the independent guide wheel (20) and the slot hole (112), and an upper part of the independent wheel set (18) is slidably arranged in the slot hole (112), two sides of the independent wheel set (18) are provided with wheels (12), and the independent wheel set (18) is provided with a fixing hole (181) for mutual fixation with the fixed part (11).

6. The telescopic linear motor structure for the sliding door according to claim 1, characterized in that:

the other end of the fixed part (11) is provided with an independent guide wheel (20) without a telescopic rod (14).

7. The telescopic linear motor structure for the sliding door according to claim 6, characterized in that:

the independent guide wheel (20) comprises a mounting block, two sides of the mounting block are provided with wheels (12), and two sides of an upper part of the mounting block are provided with inserting parts which can be inserted in different positions of the rotor assembly (1) along a length direction of the rotor assembly (1).

8. The telescopic linear motor structure for the sliding door according to claim 6, characterized in that:

an independent wheel set (18) is further arranged between the independent guide wheel (20) and the slot hole (112), and an upper part of the independent wheel set (18) is slidably arranged in the slot hole (112), two sides of the independent wheel set (18) are provided with wheels (12), and the independent wheel set (18) is provided with a fixing hole (181) for mutual fixation with the fixed part (11).

* * * * *